(12) United States Patent
Belelie et al.

(10) Patent No.: US 7,323,498 B2
(45) Date of Patent: Jan. 29, 2008

(54) WAX-TETHERED PHOTOINITIATORS

(75) Inventors: Jennifer L. Belelie, Oakville (CA);
Peter G. Odell, Mississauga (CA);
Daryl Vanbesien, Burlington (CA);
Jessica F. Jordao, Richmond Hill (CA)

(73) Assignee: Xerox Corporation, Norwalk, CT (US)

( * ) Notice: Subject to any disclaimer, the term of this patent is extended or adjusted under 35 U.S.C. 154(b) by 342 days.

(21) Appl. No.: 11/136,525

(22) Filed: May 25, 2005

(65) Prior Publication Data
US 2006/0270754 A1 Nov. 30, 2006

(51) Int. Cl.
*C08F 2/46* (2006.01)
*C07C 49/78* (2006.01)
*C07C 69/02* (2006.01)
*C07C 69/003* (2006.01)

(52) U.S. Cl. .......................... 522/33; 522/35; 522/42; 522/182; 560/129; 560/205; 568/335

(58) Field of Classification Search ................. 522/42, 522/35, 33, 121, 157, 182; 560/129, 205; 568/335
See application file for complete search history.

(56) References Cited

U.S. PATENT DOCUMENTS

| | | | |
|---|---|---|---|
| 4,954,416 A * | 9/1990 | Wright et al. ............ | 430/281.1 |
| 5,532,112 A * | 7/1996 | Kohler et al. ............ | 430/281.1 |
| 6,596,786 B2 * | 7/2003 | Purvis et al. .................. | 522/35 |
| 6,824,942 B2 | 11/2004 | Silence et al. | |
| 7,068,902 B2 * | 6/2006 | Gantt et al. .................. | 385/128 |

* cited by examiner

*Primary Examiner*—Susan Berman

(74) *Attorney, Agent, or Firm*—Oliff & Berridge, PLC

(57) ABSTRACT

A wax-tethered photoinitiator that is a photoinitiator compound including a wax chain therein, wherein the photoinitiator compound is activated by ultraviolet radiation, and method of making the same is described. The wax-tethered photoinitiator may be used in a curable wax composition for incorporation into a toner. The wax-tethered photoinitiator exhibits an affinity for the wax phase, thereby insuring its presence in the wax for the initiation of curing thereof.

10 Claims, No Drawings

WAX-TETHERED PHOTOINITIATORS

BACKGROUND

Described herein are wax-tethered photoinitiators for use in inks or toners containing a large wax component.

SUMMARY

In a first embodiment, described is a wax-tethered photoinitiator comprising a photoinitiator compound including a wax chain therein, wherein the photoinitiator compound is activated by ultraviolet radiation.

In a further embodiment, described is a method of making a wax-tethered photoinitiator comprising a photoinitiator compound including a wax chain therein, wherein the photoinitiator compound is activated by ultraviolet radiation, the method comprising reacting the photoinitiator compound with a compound containing the wax chain.

In a still further embodiment, described is a curable wax composition comprising a curable wax and a wax-tethered photoinitiator comprising a photoinitiator compound including a wax chain therein, wherein the photoinitiator compound is activated by ultraviolet radiation.

DETAILED DESCRIPTION OF EMBODIMENTS

In a first embodiment, described is a wax-tethered photoinitiator comprising a photoinitiator compound including a wax chain therein, wherein the photoinitiator compound is activated by ultraviolet radiation.

In general, the wax-tethered photoinitiator may be characterized as having the formula $R^1COOR^2$, wherein $R^1$ represents the wax chain and $R^2$ represents a photoinitiator.

By "wax chain" as used herein is meant any chain exhibiting wax-like properties, without limitation. Wax chains typically include predominantly longer-chain hydrocarbons that are solid at room temperature, and including alcohol, carboxylic acid and amine derivatives. A suitable definition of wax can be found on page 1172 of the Concise Encyclopedia Chemistry, published by Walter de Gruyter, New York, 1994. As stated therein, waxes include natural, modified natural, and synthetic products. In some embodiments, the "wax chain" need not meet all the characteristics of a wax so long as it remains compatible with a wax.

The wax chain preferably imparts to the photoinitiator compound a high affinity to a wax phase in which the photoinitiator compound is preferably dispersed. That is, the wax chain adds a waxy tail to the photoinitiator compound, thereby imparting wax-like characteristics to the photoinitiator compound such that the compound disperses in a wax.

As the photoinitiator compound, any known photoinitiator that is activated by ultraviolet (UV) radiation and is capable of initiating the curing/polymerization of the curable wax described herein upon exposure to such UV radiation and is equipped with a reactive handle, such as hydroxyl, amine or carboxylic acid, can be used without limitation. The UV sensitivity range may be anywhere in the ultraviolet range, i.e., in the range of wavelengths of from about 10 to about 400 nm.

Preferably, the photoinitiator compound includes a reactive site therein where the compound is reacted with a compound containing the wax chain in order to provide the wax chain in the photoinitiator compound. As an example of such a photoinitiator, mention may be made of 4-(2-hydroxyethyloxy)phenyl-(2-hydroxy-2-propyl) ketone, commercially available from Ciba Specialty Chemicals Inc. as IRGACURE® 2959, which is equipped with a primary hydroxyl group. The hydroxyl group provides a reactive site, for example an esterification site, where the compound containing the wax chain may react to chemically bond (tether) the wax chain to the photoinitiator.

As the wax chain included in the wax-tethered photoinitiator, the wax chain preferably comprises an aliphatic hydrocarbon. While an aliphatic hydrocarbon of any chain length may be used, so long as the chain is of sufficient length to impart wax characteristics, the aliphatic hydrocarbon preferably has a chain length of from about 18 to about 100 carbon atoms.

Example materials that may provide the wax chain may include carboxylic acid terminated polyethylene wax, fatty acid, Guerbet acid, or mixtures thereof.

In a preferred embodiment, the wax-tethered photoinitiator includes therein a wax chain derived from a wax having carboxylic acid functionality, i.e., including therein a carboxyl group, which carboxyl group participates in the reaction with the photoinitiator compound in bonding the wax chain thereto. For example, the wax chain preferably has a formula RCOO—, wherein R is an aliphatic hydrocarbon of from about 18 to about 100 carbon atom chain length. Alternatively, the wax chain is derived from an aliphatic hydrocarbon having carboxylic acid functionality and has a number average molecular weight of from about 100 to about 1,000.

In a most preferred embodiment, the compound containing the wax chain is a linear primary carboxylic acid hydrocarbon. Such compounds are commercially available from Baker Petrolite as UNICID acids. Mention may be made of UNICID 350, 425, 550 and 700, which have number average molecular weights of 390, 475, 565 and 720, respectively. The carboxyl group is esterified by reaction with the primary hydroxyl group of the preferred photoinitiator compounds, thereby incorporating the wax chain of the carboxylic acid hydrocarbon into the photoinitiator compound.

An example reaction scheme of this preferred embodiment is shown below, in which carboxylic acid hydrocarbon 1 reacts with Irgacure 2959 (photoinitiator, 2) in the presence of p-toluenesulfonic acid (3), which acts as a catalyst to form wax-tethered photoinitiator 4. R, as described above, is an aliphatic hydrocarbon, preferably having a chain length of about 18 to about 100 carbon atoms. Although p-toluenesulfonic acid is shown as the catalyst in the illustration, other catalysts may be used without restriction.

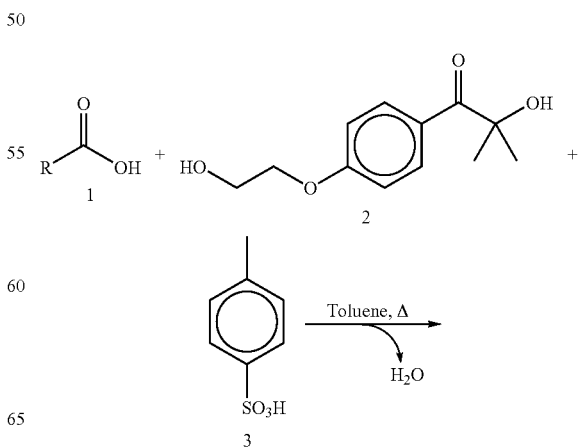

-continued

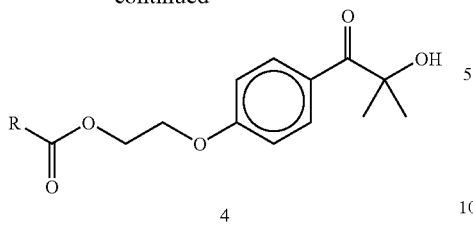

4

In the reaction, the compound including the wax chain and the photoinitiator compound are added such that the compound including the wax chain is added in amounts of from about 0.2 to 1.4 parts to 1.0 parts of the photoinitiator compound, on a molar equivalent basis. Preferably, the compound including the wax chain and the photoinitiator compound are added in approximately 1:1 molar equivalent amounts.

The wax-tethered photoinitiator thus has a waxy tail incorporated therein. The compatibility with, and affinity for, a wax is thus established.

The wax-tethered photoinitiator is preferably incorporated into a wax composition, in particular a wax composition containing a curable wax. The curable wax may be any wax that can be cured/polymerized and/or crosslinked. The curing is initiated by the wax-tethered photoinitiator upon exposure to UV radiation, e.g., UV light.

As example waxes, mention may be made of waxes including reactive functional groups therein that permit the wax to be cured. The reactive functional groups may be, for example, acrylic or methacrylic groups. The wax may have a weight average molecular weight of from about 1,000 to about 5,000, for example, and preferably has a melting temperature of, for example, about 70° C. to about 130° C., preferably about 80° C. to about 120° C.

The wax composition may preferably include a crosslinking compound, enabling formation of a crosslinked wax complex upon curing following exposure to UV radiation. As the crosslinking compound, mention may be made of di- or higher functionality reactive species such as cyclohexane dimethanol diacrylate, 1,6-hexanediol diacrylate, trimethylpropane triacrylate, tris(2-hydroxy ethyl) isocyanurate triacrylate, dipentaerythritol pentacrylate or custom synthesized materials such as the diacrylate ester of sebacic ($C_8$) or higher. The crosslinking compound may be present in amounts of from, for example, 0 to about 80% by weight of the wax composition.

To achieve adequate curing, it is necessary for the photoinitiator to be present with the wax when the wax-based toner or ink image is exposed to UV radiation. Conventional photoinitiators that do not include a wax chain therein may be segregated from the wax phase during formation of a wax dispersion, or during toner aggregation or coalescence. Addition of the wax chain avoids this problem by providing the photoinitiator with an affinity for the wax phase. Thus, the wax-tethered photoinitiator stays with the wax during ink or toner manufacture. The wax-tethered photoinitiator thus has the advantage of providing a sufficiently cured wax-based document offset barrier upon the toner surface.

Embodiments will now be further illustrated by way of the following examples.

The following examples illustrate preparation of the wax-tethered photoinitiators.

EXAMPLE I (IRGACURE 2959 Ester of UNICID 350)

To a 100 mL three neck, round bottom flask equipped with a dropping funnel, Dean-Stark trap, reflux condenser and stopper was added UNICID 350 (about 80% hydroxyl-terminated polyethylene wax consisting of carbon chains with the structure $CH_3$—$(CH_2)_n$—COOH, where there is a mixture of chain lengths, n, where the average chain length is preferably in the range of about 22 to about 24 and about 20% linear low molecular weight polyethylene of similar average chain length; 10.00 g, hydroxyl number 111.20 mg KOH/g, 69 wt %, obtained from Baker Petrolite, Tulsa, Okla.), p-toluenesulfonic acid (0.12 g, 0.8 wt %, obtained from Sigma-Aldrich Co., Milwaukee, Wis.), hydroquinone (0.01 g, 0.1 wt %, obtained from Sigma-Aldrich Co., Milwaukee, Wis.) and toluene (40 mL). The reaction mixture was heated with stirring until homogeneous, after which time IRGACURE 2959 (4.44 g, 30 wt %, obtained from Ciba Specialty Chemicals Inc., Basel, Switzerland) was added portionwise. The reaction mixture was refluxed until water ceased to collect in the Dean-Stark trap. Reaction completion was confirmed via $^1$H NMR spectroscopy at 80° C. in toluene-$d_8$: the $A_2B_2$ proton pattern between ~δ3.60-3.48, representing the two sets of methylene protons from IRGACURE 2959, are consumed and are replaced by triplets ca. δ4.20 (RCOOC$\underline{H}_2$CH$_2$OPhCOC(CH$_3$)$_2$OH) and triplets ca. δ3.80 (RCOOCH$_2$C$\underline{H}_2$OPhCOC(CH$_3$)$_2$OH). The reaction was cooled to room temperature and filtered. The solid was triturated with cold methanol, filtered and dried in vacuo. The toluene filtrate was concentrated in vacuo. The remaining solid was triturated with cold methanol, filtered and dried in vacuo. In total, 10.5 g of an off-white solid was recovered (broad mp ca. 63° C.). $^1$H NMR (300 MHz, toluene-$d_8$, 80° C.) δ8.01 (0.7H, d, J=9.0 Hz), 7.63 (0.4H, d, J=8.7 Hz), 6.81 (0.4H, d, J=8.7 Hz), 6.67 (0.7H, d, J=9.0 Hz), 4.20 (1.3H, $t_1$, $J_{t1}$=4.9 Hz and $t_2$, $J_{t2}$=5.0 Hz), 3.80 (1.3H, $t_3$, $J_{t3}$=4.9 Hz and $t_4$, $J_{t4}$=5.0 Hz), 2.20-2.14 (1.3H, m), 1.68-1.49 (3.0H, m), 1.43-1.18 (56H, m), 0.91 (3H, t, J=6.6 Hz).

EXAMPLE II (IRGACURE 2959 Ester of UNICID 425)

To a 100 mL three neck, round bottom flask equipped with a dropping funnel, Dean-Stark trap, reflux condenser and stopper was added UNICID 425 (about 80% hydroxyl-terminated polyethylene wax consisting of carbon chains with the structure $CH_3$—$(CH_2)_n$—COOH, where there is a mixture of chain lengths, n, where the average chain length is preferably in the range of about 28 to about 30 and about 20% linear low molecular weight polyethylene of similar average chain length; 10.00 g, hydroxyl number 79.80 mg KOH/g, 75 wt %, obtained from Baker Petrolite, Tulsa, Okla.), p-toluenesulfonic acid (0.11 g, 0.8 wt %, obtained from Sigma-Aldrich Co., Milwaukee, Wis.), hydroquinone (0.01 g, 0.1 wt %, obtained from Sigma-Aldrich Co., Milwaukee, Wis.) and toluene (40 mL). The reaction mixture was heated with stirring until homogeneous, after which time IRGACURE 2959 (3.19 g, 24 wt %, obtained from Ciba Specialty Chemicals Inc., Basel, Switzerland) was added portionwise. The reaction mixture was refluxed until water ceased to collect in the Dean-Stark trap. Reaction completion was confirmed via variable temperature $^1$H NMR spectroscopy in toluene-$d_8$ at 80° C.: the $A_2B_2$ proton pattern between ~δ3.60-3.48, representing the two sets of methylene protons from Irgacure 2959, are consumed and are replaced by triplets ca. δ4.23 (RCOOC$\underline{H}_2$CH$_2$OPhCOC(CH$_3$)$_2$OH) and triplets ca. δ3.82 (RCOOCH$_2$C$\underline{H}_2$OPhCOC(CH$_3$)$_2$OH). The reaction was cooled to room temperature and filtered. The solid was triturated with cold methanol, filtered and dried in vacuo. The toluene filtrate was concentrated in vacuo. The remaining solid was triturated with cold methanol, filtered and dried in vacuo. In total, 10.2 g of an off-white solid was recovered (broad mp ca. 79° C.). $^1$H NMR (300 MHz, toluene-$d_8$, 80° C.) δ8.02 (0.8H, d, J=9.0 Hz), 7.64 (0.2H, d, J=8.8 Hz), 6.83 (0.2H, d, J=8.8 Hz), 6.68 (0.8H, d, J=9.0 Hz), 4.23 (1.1H, $t_1$, $J_{t1}$=4.8 Hz and $t_2$, $J_{t2}$=5.0 Hz), 3.82 (1.1H, $t_3$, $J_{t3}$=5.0 Hz and $t_4$, $J_{t4}$=5.0 Hz), 2.21-2.15 (1.1H, m), 1.69-1.50 (2.1H, m), 1.42-1.14 (60H, m), 0.91 (3H, t, J=6.5 Hz).

EXAMPLE III (IRGACURE 2959 Ester of UNICID 550)

To a 100 mL three neck, round bottom flask equipped with a dropping funnel, Dean-Stark trap, reflux condenser and stopper was added UNICID 550 (about 80% hydroxyl-terminated polyethylene wax consisting of carbon chains with the structure CH$_3$—(CH$_2$)$_n$—COOH, where there is a mixture of chain lengths, n, where the average chain length is preferably in the range of about 38 to about 40 and about 20% linear low molecular weight polyethylene of similar average chain length; 10.00 g, hydroxyl number 85.50 mg KOH/g, 74 wt %, obtained from Baker Petrolite, Tulsa, Okla.), p-toluenesulfonic acid (0.11 g, 0.8 wt %, obtained from Sigma-Aldrich Co., Milwaukee, Wis.), hydroquinone (0.01 g, 0.1 wt %, obtained from Sigma-Aldrich Co., Milwaukee, Wis.) and toluene (40 mL). The reaction mixture was heated with stirring until homogeneous, after which time IRGACURE 2959 (3.42 g, 25 wt %, obtained from Ciba Specialty Chemicals Inc., Basel, Switzerland) was added portionwise. The reaction mixture was refluxed until water ceased to collect in the Dean-Stark trap. Reaction completion was confirmed via variable temperature $^1$H NMR spectroscopy in toluene-$d_8$ at 80° C.: the $A_2B_2$ proton pattern between ~δ3.60-3.48, representing the two sets of methylene protons from Irgacure 2959, are consumed and are replaced by triplets ca. δ4.22 (RCOOC$\underline{H}_2$CH$_2$OPhCOC(CH$_3$)$_2$OH) and triplets ca. δ3.81 (RCOOCH$_2$C$\underline{H}_2$OPhCOC(CH$_3$)$_2$OH). The reaction was cooled to room temperature and filtered. The solid was triturated with cold methanol, filtered and dried in vacuo. The toluene filtrate was concentrated in vacuo. The remaining solid was triturated with cold methanol, filtered and dried in vacuo. In total, 10.1 g of an off-white solid (broad mp ca. 81° C.) was recovered. $^1$H NMR (300 MHz, toluene-$d_8$, 80° C.) δ8.01 (1H, d, J=9.0 Hz), 7.63 (0.2H, d, J=8.7 Hz), 6.82 (0.2H, d, J=9.0 Hz), 6.67 (1H, d, J=9.0 Hz), 4.22 (1.2H $t_1$, $J_{t1}$=5.1 Hz and $t_2$, $J_{t2}$=4.9 Hz), 3.81 (0.2H, t, J=5.1 Hz), 3.76 (1H, t, J=4.9 Hz), 2.20-2.14 (1.5H, m), 1.67-1.50 (2.8H, m), 1.41-1.18 (66H, m), 0.91 (3H, t, J=6.5 Hz).

EXAMPLE IV (IRGACURE 2959 Ester of UNICID 700)

To a 100 mL three neck, round bottom flask equipped with a dropping funnel, Dean-Stark trap, reflux condenser and stopper was added UNICID 700 (about 80% hydroxyl-terminated polyethylene wax consisting of carbon chains with the structure CH$_3$—(CH$_2$)$_n$—COOH, where there is a mixture of chain lengths, n, where the average chain length is preferably in the range of about 46 to about 48 and about 20% linear low molecular weight polyethylene of similar average chain length; 10.00 g, hydroxyl number 57.90 mg KOH/g, 80 wt %, obtained from Baker Petrolite, Tulsa, Okla.), p-toluenesulfonic acid (0.10 g, 0.8 wt %, obtained from Sigma-Aldrich Co., Milwaukee, Wis.), hydroquinone (0.01 g, 0.1 wt %, obtained from Sigma-Aldrich Co., Milwaukee, Wis.) and toluene (40 mL). The reaction mixture was heated with stirring until homogeneous, after which time IRGACURE 2959 (2.31 g, 19 wt %, obtained from Ciba Specialty Chemicals Inc., Basel, Switzerland) was added portionwise. The reaction mixture was refluxed until water ceased to collect in the Dean-Stark trap. Reaction completion was confirmed via variable temperature $^1$H NMR spectroscopy in toluene-$d_8$ at 80° C.: the $A_2B_2$ proton pattern between ~δ3.60-3.48, representing the two sets of methylene protons from Irgacure 2959, are consumed and are replaced by triplets ca. δ4.22 (RCOOC$\underline{H}_2$CH$_2$OPhCOC(CH$_3$)$_2$OH) and triplets ca. δ3.82 (RCOOCH$_2$C$\underline{H}_2$OPhCOC(CH$_3$)$_2$OH). The reaction was cooled to room temperature and filtered. The solid was triturated with cold methanol, filtered and dried in vacuo. The toluene filtrate was concentrated in vacuo. The remaining solid was triturated with cold methanol, filtered and dried in vacuo. In total, 10.4 g of an off-white solid was recovered (broad mp ca. 92° C.). $^1$H NMR (300 MHz, toluene-$d_8$, 80° C.) δ8.02 (0.6H, d, J=8.9 Hz), 7.64 (0.2H, d, J=8.7 Hz), 6.82 (0.2H, d, J=8.7 Hz), 6.67 (0.6H, d, J=9.0 Hz), 4.22 (0.9H $t_1$, $J_{t1}$=4.7 Hz and $t_2$, $J_{t2}$=4.9 Hz), 3.82 (0.9H $t_3$, $J_{t3}$=4.7 Hz and $t_4$, $J_{t4}$=4.9 Hz), 2.24-2.14 (0.9H, m), 1.70-1.48 (2H, m), 1.40-1.03 (79H, m), 0.91 (3H, t, J=6.7 Hz).

EXAMPLES V-XII

The following Table summarizes the compositions of these Examples.

| | Example, wt % | | | | | | | |
|---|---|---|---|---|---|---|---|---|
| Component | V | VI | VII | VIII | IX | X | XI | XII |
| UNILIN 350-acrylate[1] | 80 | 80 | 80 | 80 | | | | |
| UNILIN 425-acrylate[2] | | | | | 80 | 80 | 80 | 80 |
| Example I | 10 | | | | 10 | | | |
| Example II | | 10 | | | | 10 | | |
| Example III | | | 10 | | | | 10 | |
| Example IV | | | | 10 | | | | 10 |

-continued

| Component | Example, wt % | | | | | | | |
|---|---|---|---|---|---|---|---|---|
| | V | VI | VII | VIII | IX | X | XI | XII |
| trimethylolpropane triacrylate[3] | 10 | 10 | 10 | 10 | 10 | 10 | 10 | 10 |

[1]UNILIN 350-acrylate is an acrylate-modified wax based on UNILIN 350. To a 2 L three neck flask equipped with a reflux condenser, dropping funnel, thermometer, and Dean-Stark trap was added UNILIN 350 (about 80% hydroxyl-terminated polyethylene wax consisting of carbon chains with the structure $CH_3$—$(CH_2)_n$—$CH_2OH$, where there is a mixture of chain lengths, n, where the average chain length is preferably in the range of about 22 to about 24 and about 20% linear low molecular weight polyethylene of similar average chain length; 200 g, hydroxyl number 128.40 mg KOH/g, 79 wt %, obtained from Baker Petrolite, Tulsa, Oklahoma), p-toluenesulfonic acid (1.96 g, 0.8 wt %, obtained from Sigma-Aldrich Co., Milwaukee, Wisconsin), hydroquinone (0.25 g, 0.1 wt %, obtained from Sigma-Aldrich Co., Milwaukee, Wisconsin) and toluene (600 mL). The reaction mixture was heated until dissolved. Acrylic acid (48 mL, 20 wt %) was added slowly by the addition funnel. The reaction was allowed to reflux until water ceased collecting in the Dean-Stark trap. Completion of the reaction was confirmed by $^1H$ NMR spectroscopy in toluene-$d_8$ (80° C.): the methylene protons adjacent to the hydroxyl group ($\delta 3.38$, t) were consumed and replaced by a series of triplets between $\delta 4.30$ and 3.97, representing $RCH_2CH_2OOCCH:CH_2$. At the end of the reaction, the mixture was cooled to room temperature and filtered. The solid was triturated with methanol, filtered, and dried in a vacuum oven. The toluene filtrate was concentrated in vacuo, triturated with cold methanol, filtered, and dried in a vacuum oven. In total, 180.2 g of a yellow solid (broad mp ca. 50° C.) was recovered.
[2]UNILIN 425-acrylate is an acrylate-modified wax based on UNILIN 425. To a 500 mL three neck flask equipped with a reflux condenser, dropping funnel, thermometer, and Dean-Stark trap was added UNILIN 425 (about 80% hydroxyl-terminated polyethylene wax consisting of carbon chains with the structure $CH_3$—$(CH_2)_n$—$CH_2OH$, where there is a mixture of chain lengths, n, where the average chain length is preferably in the range of about 28 to about 30 and about 20% linear low molecular weight polyethylene of similar average chain length; 50 g, hydroxyl number 105.40 mg KOH/g, 82 wt %, obtained from Baker Petrolite, Tulsa, Oklahoma), p-toluenesulfonic acid (0.50 g, 0.8 wt %, obtained from Sigma-Aldrich Co., Milwaukee, Wisconsin), hydroquinone (0.07 g, 0.1 wt %, obtained from Sigma-Aldrich Co., Milwaukee, Wisconsin) and toluene (150 mL). The reaction mixture was heated until dissolved. Acrylic acid (9.7 mL, 17 wt %) was added slowly by the addition funnel. The reaction was allowed to reflux until water ceased collecting in the Dean-Stark trap. Completion of the reaction was confirmed by $^1H$ NMR spectroscopy in toluene-$d_8$ (80° C.): the methylene protons adjacent to the hydroxyl group ($\delta 3.47$-3.30, m) were consumed and replaced by a series of triplets between $\delta 4.29$ and 3.96, representing $RCH_2CH_2OOCCH:CH_2$. At the end of the reaction, the mixture was cooled to room temperature and filtered. The solid was triturated with methanol, filtered, and dried in a vacuum oven. The toluene filtrate was concentrated in vacuo, triturated with cold methanol, filtered, and dried in a vacuum oven. In total, 44.5 g of a yellow solid (broad mp ca. 75° C.) was recovered.
[3]Trimethylolpropane triacrylate is commercially available from Sigma-Aldrich Co., Milwaukee, Wisconsin The components for Examples V-XII were stirred at 100° C. for 30 min. In each case, the formulations were clear and pale yellow, proving that the wax-tethered photoinitiators described in Examples I-IV were soluble in UV curable waxes UNILIN 350-acrylate and UNILIN 425-acrylate. Each formulation was pipetted onto a glass slide as a liquid at 100° C. and exposed to UV light from a UV Fusion LC-6B Benchtop Conveyor equipped with UV Fusion F300S Ultraviolet Lamp System employing a "D" bulb for about 5 s. The cured samples were heated at 100° C. for 30 min and did not completely remelt, indicating that polymerization had occurred.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art that are also intended to be encompassed by the following claims.

What is claimed is:

1. A wax-tethered photoinitiator comprising a photoinitiator compound including a wax chain therein, wherein the photoinitiator compound is activated by ultraviolet radiation wherein the wax-tethered photoinitiator has the formula $R^1COOR^2$, wherein $R^1$, the wax chain, is an aliphatic hydrocarbon of from about 18 to about 100 carbon atom chain length, and $R^2$ represents a photoinitiator.

2. The wax-tethered photoinitiator according to claim 1, wherein the wax chain is provided by an aliphatic hydrocarbon having carboxylic acid functionality and has a number average molecular weight of from about 100 to about 1,000.

3. The wax-tethered photoinitiator according to claim 1, wherein the wax chain is provided by a carboxylic acid terminated polyethylene wax, fatty acid, Guerbet acid, or mixtures thereof.

4. A method of making a wax-tethered photoinitiator comprising a photoinitiator compound including a wax chain therein, wherein the photoinitiator compound is activated by ultraviolet radiation wherein the wax-tethered photoinitiator has the formula $R^1COOR^2$, wherein $R^1$, the wax chain, is an aliphatic hydrocarbon of from about 18 to about 100 carbon atom chain length, and $R^2$ represents a photoinitiator, the method comprising reacting the photoinitiator compound with a compound containing the wax chain.

5. The method according to claim 4, wherein the photoinitiator compound includes a primary hydroxyl group, and wherein the primary hydroxyl group is esterified by reacting the photoinitiator compound with the compound containing the wax chain.

6. The method according to claim 5, wherein the compound containing the wax chain includes a carboxylic acid group that reacts with the primary hydroxyl group of the photoinitiator compound.

7. A curable wax composition comprising a curable wax and a wax-tethered photoinitiator comprising a photoinitiator compound including a wax chain therein, wherein the photoinitiator compound is activated by ultraviolet radiation wherein the wax-tethered photoinitiator has the formula $R^1COOR^2$, wherein $R^1$, the wax chain, is an aliphatic hydrocarbon of from about 18 to about 100 carbon atom chain length, and $R^2$ represents a photoinitiator.

8. The curable wax composition according to claim 7, wherein the curable wax includes functionalized reactive groups.

9. The curable wax composition according to claim 7, wherein the wax chain is provided by an aliphatic hydrocarbon having carboxylic acid functionality and has a number average molecular weight of from about 100 to about 1,000.

10. The curable wax composition according to claim 7, wherein the wax chain is provided by a carboxylic acid terminated polyethylene wax, fatty acid, Guerbet acid, or mixtures thereof.

* * * * *